June 13, 1939.  F. H. CALLAHAN  2,161,910
ARTICLE OF FOOD
Original Filed Feb. 26, 1937
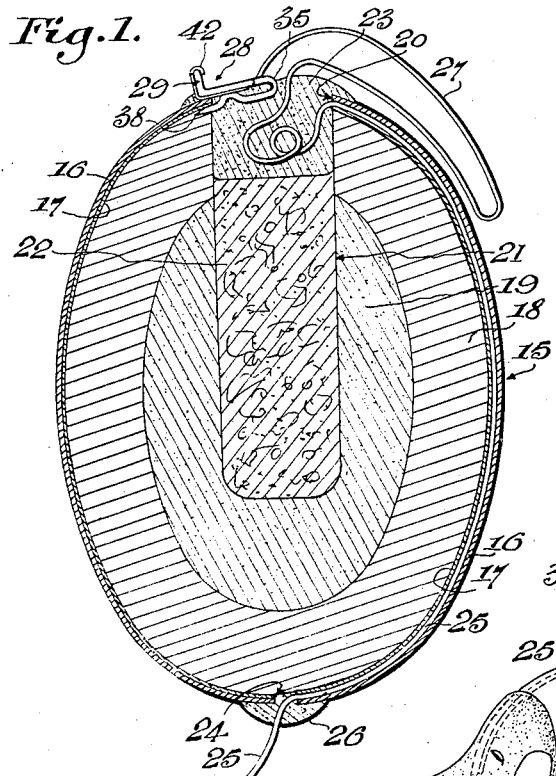
Fig.1.
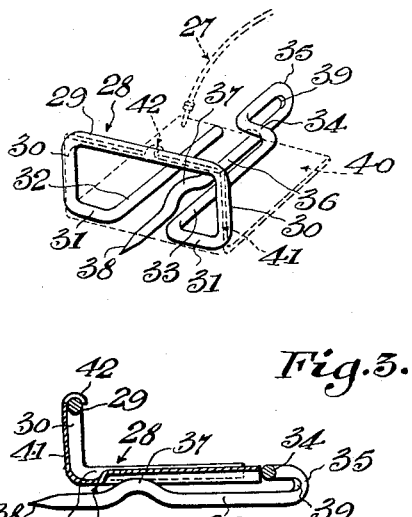
Fig.2.
Fig.3.
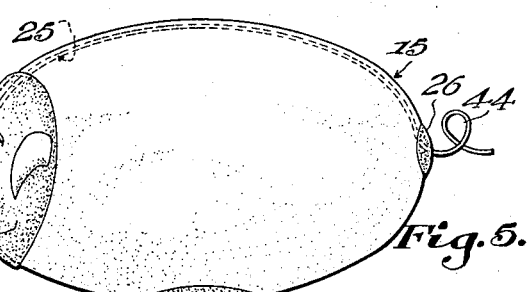
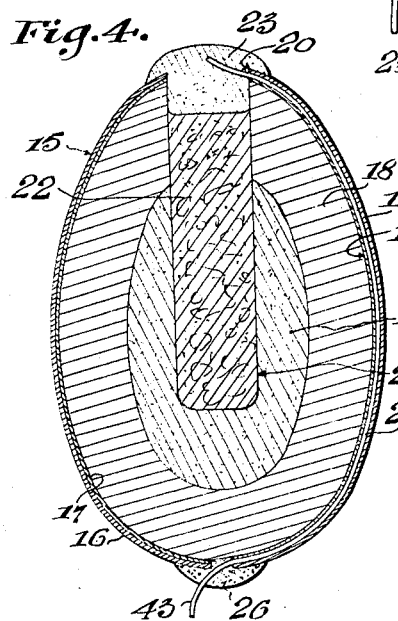
Fig.4.
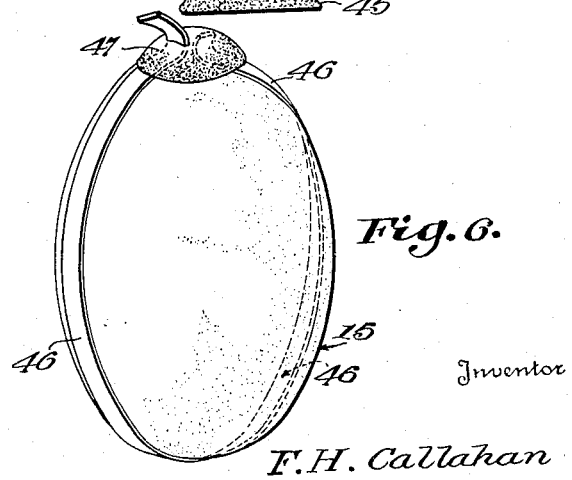
Fig.5.
Fig.6.
Inventor
F. H. Callahan
By H. B. Willson & Co
Attorneys
WITNESS
H. Woodard Patented June 13, 1939

2,161,910

UNITED STATES PATENT OFFICE 2,161,910

ARTICLE OF FOOD

Francis Henry Callahan, New Haven, Conn.

Application February 26, 1937, Serial No. 127,999
Renewed November 8, 1938

3 Claims. (Cl. 99—113)

The invention aims primarily to provide a hen or other fowl egg with simple and inexpensive means whereby its shell may be removed without the customary trouble, and the egg may be provided with said means either while raw, to prepare it for shelling after hard-boiling, or after hard-boiling. Then too, the shelling means may be used to advantage whether the egg shell contain only the natural meat of the egg, or some of that meat and some other edible substance, either solid or liquid.

With the foregoing in view, the invention resides in the novel subject matter hereinafter described and claimed, description being accomplished by reference to the accompanying drawing.

Fig. 1 is a longitudinal sectional view showing a form of the invention including a shell-splitting instrument.

Fig. 2 is a perspective view of the shell-splitting instrument of Fig. 1, the guard plate being shown in dotted lines.

Fig. 3 is a longitudinal section of the shell-splitting instrument of Figs. 1 and 2.

Fig. 4 is a longitudinal sectional view showing a different form of the invention.

Fig. 5 is a side elevation of a novelty produced in accordance with the invention.

Fig. 6 is a perspective view showing another form of the invention.

The invention is shown in connection with a hard-boiled egg 15. For future reference, the egg shell is denoted at 16, the skin at the inner side of said shell at 17, the egg white at 18, and the yolk at 19. Part of the natural meat of the egg may be removed after forming an opening 20 in one end thereof to provide a recess 21 and any desired edible filler 22, either solid or liquid, may be placed in this recess, the opening 20 being then suitably sealed as shown at 23. The seal may be ordinary wax or other suitable substance. Another but much smaller opening 24 is formed through the shell 16 at a point distant from the opening 20, preferably at the opposite end of the egg, and a flexible shell-severing element 25 is positioned within the shell, preferably between said shell and the skin 17, the ends of said flexible element extending through the openings 20 and 24. This element 25 is held at one end by embedding it in the seal 23 and is held at its other end by embedding it in a seal 26 which is provided for the opening 24, said seal 26 being formed of wax or the like. One of these seals may carry a label (not shown) signifying the kind of filler which will be found within the egg.

In Fig. 1, one end of the flexible element 25 extends quite a distance beyond the seal 23 as shown at 27 and is attached to a shell splitting instrument 28 which may be normally clipped over the edge of the opening 20 and held in place by said seal 23. If the entire shell is to be removed from the egg, the projecting end 27 may simply be pulled toward the seal 26, causing severing of the egg shell to permit quick and easy removal. If it be desired, however, to cut off say the upper half of the shell leaving the contents supported in and projecting above the lower half, the instrument 28 may be used, or this instrument may be employed to sever the egg shell wherever desired to facilitate removal.

The instrument 28 is preferably formed primarily from a single piece of fine wire. This wire is bent between its ends to provide an arched handle 29. At the lower ends of the legs 30 of this arched handle, the end portions of the wire are bent inwardly toward each other as shown at 31. The wire is then bent so that its end portions project in the same direction from the handle 29 to provide longitudinal wire reaches 32 and 33 for disposition at the exterior of the egg shell. The reach 33 is laterally offset somewhat as denoted at 34 and is bent substantially upon itself at 35 to provide a longitudinal finger 36 for disposition at the interior of the egg shell. Between its ends, this finger is provided with a hump 37 which assists it in severing or splitting the egg shell, and the free end of said finger is pointed at 38 so that it may be pushed through the shell at any desired point. At the bend where the finger 36 and the wire reach 33 join each other, said bend is preferably sharpened somewhat as shown at 39 to provide a cutting edge primarily for cutting the skin 17, but assisting also in severing or splitting the shell.

Preferably a thin sheet metal guard plate 40 extends under the reaches 32 and 33 and over the finger 36, one end of said guard plate being provided with an upwardly bent flange 41 lying against one side of the handle 29 and secured to this handle by a prong or the like 42 bent over the same.

The instrument 28 is moved by hand with the guard plate 40 lying upon the outside of the shell and the finger 36 within the shell, causing said instrument to sever or split said shell along any line upon which it may be moved. The end 27 of the flexible element 25 may well be attached to one corner of the guard plate 40 and may, if desired, be of such length as to constitute a radius cord to facilitate movement of the instrument 28 upon a circular course when cutting off the upper half of the egg shell.

The flexible element 25 may be of any desired character, fine wire, thread or cord being preferred, and said flexible element may be passed through the opening 24 and guided to the opening 20 or vice versa by means of an appropriate curved resilient needle.

If desired, the element 25 may be in the form of a fine strip of wood as shown in Fig. 4, with one of its ends 43 projecting beyond one of the seals 23 or 26 so that it may be pulled to sever the shell and facilitate removal.

In Fig. 5, the manner in which a very attractive novelty may be produced embodying the invention, is shown. In this view, the seal 23 is provided with an enlarged portion 23a simulating the nose of an animal. One end of the flexible element 25 is embedded in this seal and the other end 44 thereof projects beyond the seal 26 to represent the animal's tail. This "tail" is pulled when the shell is to be removed. The imitation animal is preferably provided with a base 45 of wax or other preferred material to cause it to stand upright.

In Fig. 6, a flat strip of flexible material such as ordinary tape 46 is appropriately cemented to the exterior of the egg shell and preferably circumscribes the egg. Normally both ends of the strip 46 are secured by a suitable seal or the like 47 with one end projecting from said seal to be conveniently pulled when the shell is to be removed.

From the foregoing, taken in connection with the accompanying drawing, various ways of carrying the invention into effect will be understood but attention is invited to the fact that variations may be made within the scope of the invention as claimed.

I claim:

1. A method of providing a fowl egg with a flexible shelling element, comprising the steps of forming an opening through each end of the egg shell, guiding said flexible element from one of said openings along the inner side of the shell to the other of said openings, and sealing said openings around said flexible element with one end of the latter projecting accessibly for pulling.

2. A method of providing a stuffed egg equipped with a flexible shelling element, comprising the steps of forming a relatively large opening through one end of the egg shell and a smaller opening through the other end thereof, removing part of the egg meat through said relatively large opening, guiding said flexible element from one of said openings along the inner side of the shell to the other of said openings, stuffing the egg through said relatively large opening, and sealing both of said openings around said flexible element with one end of the latter projecting accessibly for pulling.

3. A method of providing a fowl egg with a flexible though somewhat stiff shelling strip, comprising the steps of forming an opening through an end of the egg shell, inserting said strip into said opening and guiding it along the inner side of the shell to the other end of the latter, and sealing said opening around said strip.

FRANCIS HENRY CALLAHAN.